United States Patent
Dagman

(10) Patent No.: US 8,218,941 B1
(45) Date of Patent: Jul. 10, 2012

(54) METHOD AND SYSTEM TO TRANSFER VIDEO FROM A VIDEO SOURCE TO OPTICAL MEDIA

(75) Inventor: Vadim Dagman, Foster City, CA (US)

(73) Assignee: Monsoon Multimedia, San Mateo, CA (US)

( * ) Notice: Subject to any disclaimer, the term of this patent is extended or adjusted under 35 U.S.C. 154(b) by 800 days.

(21) Appl. No.: 12/141,730

(22) Filed: Jun. 18, 2008

(51) Int. Cl.
*H04N 5/76* (2006.01)

(52) U.S. Cl. ........ 386/235; 386/241; 386/226; 386/329; 369/84

(58) Field of Classification Search ............ 386/52, 386/83, 241, 235, 46, 226, 329, 370, 125; 369/84
See application file for complete search history.

(56) References Cited

U.S. PATENT DOCUMENTS

| | | | |
|---|---|---|---|
| 7,483,618 B1 * | 1/2009 | Edwards et al. | 386/278 |
| 2002/0154885 A1 * | 10/2002 | Covell et al. | 386/1 |
| 2005/0141386 A1 * | 6/2005 | Wu et al. | 369/84 |
| 2005/0226605 A1 * | 10/2005 | Wang et al. | 386/125 |
| 2006/0294376 A1 * | 12/2006 | Sands et al. | 713/168 |
| 2007/0098353 A1 * | 5/2007 | Chen et al. | 386/46 |

\* cited by examiner

*Primary Examiner* — Jeffrey Pwu
*Assistant Examiner* — Hee Song
(74) *Attorney, Agent, or Firm* — Kevin Roe

(57) ABSTRACT

A method and system to control at least one audio/video recording system. A first embodiment is a method to control at least one audio/video recording system. The method includes receiving audio/video stream, storing the audio/video stream in a storage module, and synchronizing the recording of the one or more audio/video files by a media burner module on recording media, such as a DVD, flash memory, or an equivalent non-volatile recording medium. A second embodiment is a system having modules for the acquisition of audio/video signal, modules for storing the audio/video files in a storage module, and a module for synchronizing the recording of the audio/video files by a media burner module on recording media. These embodiments can be applied in several wired and wireless communication applications, even combinations of wired and wireless technologies including, but not limited to, IEEE 802.16 wireless applications.

27 Claims, 12 Drawing Sheets

METHOD AND SYSTEM TO TRANSFER VIDEO FROM A VIDEO SOURCE TO OPTICAL MEDIA

BACKGROUND OF THE INVENTION

1. Field of the Invention

This invention relates to a method and system to control an audio/video recording system facilitating transfer of video content from a video source (e.g., an analog or digital video source such as a camcorder, or an equivalent source) to recording media (such as one or more DVDs, or equivalents) with minimal user interaction, and more particularly to methods and systems to control synchronization, buffering, and data recording on recording media in at least one audio/video recording system.

2. Description of the Prior Art

Audio/video recording systems (e.g., CD or DVD recording systems, and equivalents) can be used in many applications, such as for recording video data from home camcorders, television broadcasts, and other sources of video data. Typical tasks in such applications include acquisition and buffering the video data to an intermediate medium (e.g., hard drive, a mass memory medium, or an equivalent medium) and subsequently recording the video data on a recording medium, such as a CD, DVD, flash memory, or an equivalent non-volatile recording medium. Another example is acquisition and direct recording of video data on a recording medium, such as a CD, DVD, flash memory, or an equivalent non-volatile recording medium. Such applications can involve audio and/or video acquisition and recording over cable or other types of networks, or the transmission can be wireless transmissions.

There are existing schemes to control audio/video recording systems, but they require a significant complexity to provide essential functions of audio/video data buffering and recording with acceptable accuracy and reliability of the data on a recording medium, such as a CD, DVD, flash memory, or an equivalent non-volatile recording medium.

One major problem with prior art systems that involve recording of video data to an intermediate medium is the significant time required to complete the task, since it consists of two steps: first, recording video to an intermediate medium that takes as much time as the duration of the video itself (e.g., typically more than two hours for a complete camcorder tape) and second, transferring of the recorded video to a non-volatile medium that varies depending on the data transfer rate of the medium. Another major problem with prior art systems that involve direct recording to a non-volatile medium is the need to synchronize the audio/video data acquisition and recording. In that prior art, the beginning of the recording session typically requires a user to manually synchronize the recording with the beginning of the audio/video data playback or acquisition.

FIG. 1 illustrates a block diagram of a video recording system, in accordance with the prior art. This system would typically reside within a data processing system (e.g., a personal computer, or an equivalent), or have some of the following modules externally connected to the data processing system. A video source 130 acts as a video source to an encoder module 140. Video capture module 150 takes the encoded digital stream (e.g., MPEG-2, or an equivalent) from the encoder module 140 and immediately supplies the encoded stream to a media burner 180 (e.g., a DVD burner or an equivalent module) to record the encoded file on the recording media 190 (e.g., a DVD, a CD, or an equivalent).

The user (not shown) typically activates the media burner module 180 before activating the video source module 130, in order not to lose a portion of the video file initially available that would not be recorded if the media burner module 180 were activated later than the activation of the video source module 130.

Such prior art systems require the user to manually synchronize the acquisition and the recording of video files. The recording media in the media burner needs to "spin up" to start accepting data. Usually in the typical prior art system there is no straightforward way to "spin up" the media other than sending data to the burner module. While media is spinning up the video data is kept in the buffer of the burning module while new data that continues to arrive from Video Capture Module 150 is being added to the buffer. If spinning up of the media takes too long, the Burner Module buffer will overrun and important video file data will be lost in the time it takes the media burner module 180 to actually start recording video files on the recording media 190. This problem can be especially significant when the recording needs to include the earliest available portion of a video file, such as in applications like security camera activation, barely captured audio/video data, and equivalent time-critical situations.

Furthermore, there is another common problem with the acquisition and recording of video files. Even if the media burner module 180 is spun up in time for the video capture module 150 to start outputting video files, if the recording media 190 turns out to be defective or inadequate, then the video file portion recorded on the recording media 190 is typically lost. This can be especially possible when the recording media 190 is low cost and has lower reliability. Important video file data can be lost in the time it takes the user to realize that the recording media 190 is inadequate or defective in storing the video files. The same observations would also apply if the media burner module 180 itself turns out to be defective regardless of the recording media 190 used. Again, this problem can be especially significant when the recording needs to include the earliest available portion of the video file, such as in applications like security camera activation, barely captured audio/video data, and equivalent time-critical situations.

In view of the foregoing, what is needed is an improved method and system to control a video recording system, and permit direct recording of video files acquired from a video source. Various wired and wireless audio/video recording applications could benefit from such methods and systems.

SUMMARY OF THE INVENTION

The present invention can be implemented in numerous ways, such as by a method or a system. Two aspects of the invention are described below.

A first aspect of the invention is directed to a method to operate at least one video recording system. The method includes receiving an encoded video stream with a video capture module; storing the encoded video stream in a storage module in a set of one or more video files; storing file names of the one or more encoded video files in a file tracker module as a sequence of file names; providing the file name information to a file reader module that sends encoded video files to a burner software module that operates a media burner module; and updating the file tracker module as the one or more encoded video files are successfully recorded on a recording media by the media burner module.

A second aspect of the invention is directed to a system including at least one video recording system. The system includes a video capture module to receive an encoded video stream; a recording module to organize received video stream into one or more encoded video files; a storage module coupled to the recording module, wherein the storage module stores the encoded video stream in one or more encoded video files; a media burner module, a burner software module to operate the media burner module to record the one or more encoded video files on at least one recording media; a file reader module to read video data from the encoded video files and to send video data to the burner software module for recording encoded video files on at least one recording media; a file tracker module to provide to the file reader module the sequence of one or more file names and starting position within a file if burning is resumed after being previously interrupted (e.g. because of insufficient space on the recording media); to notify a media burner module that the one or more new encoded files are available for burning and update the file name sequence information as the one or more encoded video files are successfully recorded on at least one recording media.

These and other objects and advantages of the invention will become apparent to those skilled in the art from the following detailed description of the invention and the accompanying drawings.

DETAILED DESCRIPTION OF THE PREFERRED EMBODIMENT

Figure 1:
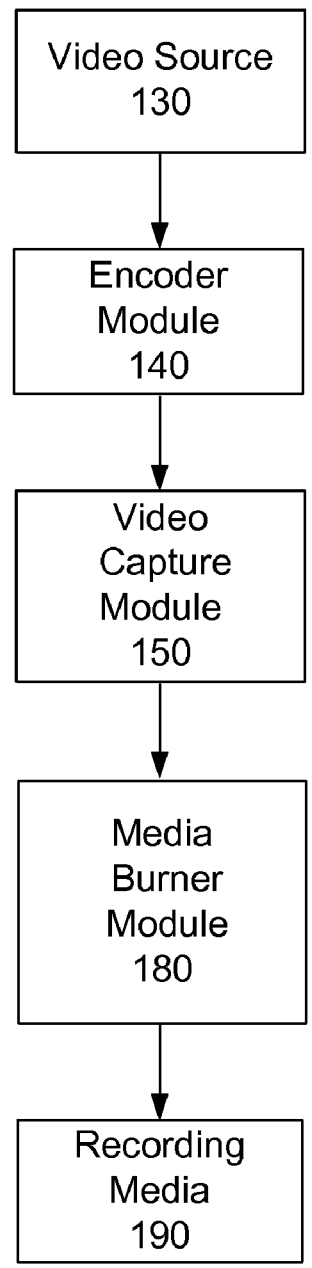
FIG. 1 illustrates a block diagram of a video recording system, in accordance with the prior art.

The invention provides a method and a system to operate a video recording system, which could be used in either wired or wireless communication systems that provide audio and/or video information. Various embodiments of the invention can be applied to communication applications, biological applications, medical applications, electronic applications, and any other applications where such methods and systems can be beneficially used. In this specification, drawings, and claims, any instance of the term "wireless" or "radio-frequency" is defined as any electromagnetic signal frequency in the frequency range of 50,000 to 100,000,000,000 cycles per second (Hertz). However, the scope of the invention should not be considered to be limited only to communication systems in accordance with these technical specifications. Certain embodiments of the invention are also applicable to other data transmission technologies, using cable communications, and other wired and wireless communications.

The present invention includes various operations and/or modules, which will be described below. The operations of the present invention may be performed by hardware components or may be embodied in machine-executable instructions, which may be used to cause a general-purpose or special-purpose processor programmed with the instructions to perform the operations. In certain embodiments, the method may be performed by processing logic that may comprise hardware (e.g., dedicated logic, programmable logic, microcode, or an equivalent), software (such as run on a general purpose computer system, a dedicated machine, or an equivalent data processing system), or a combination of both hardware and software modules.

The present invention may be provided as a computer program product, or software, that may include a machine-readable medium having stored thereon instructions, which may be used to program a computer system (or other equivalent data processing systems or electronic devices) to perform a process according to the present invention. A machine-readable medium includes any mechanism for storing or transmitting information in a form (e.g., software, processing application) readable by a machine (e.g., a computer, or an equivalent data processing system or electronic device). The machine-readable medium may includes, but is not limited to, magnetic storage medium (e.g., floppy diskette); optical storage medium (e.g., CD-ROM, DVD, or an equivalent); magneto-optical storage medium; read only memory (ROM); random access memory (RAM); erasable programmable memory (e.g., EPROM, EEPROM, or an equivalent); flash memory; electrical, optical, acoustical or other form of propagated signal (e.g., carrier waves, infrared signals, digital signals, or an equivalent); or other type of medium suitable for storing electronic instructions. The present invention may also be practiced in distributed computing environments where the machine-readable medium is stored on and/or executed by more than one data processing system.

Audio/video recorders (henceforth for simplicity referred to below as video recorders) can be used in applications supporting Universal Plug and Play (UPnP) audio/video devices and/or other devices. Such applications include controlling recording sessions and controlling transmission to other devices. Such applications can involve audio and/or video transmissions over cable or other types of networks, or the transmission can be by wireless transmissions using various protocols (e.g., IEEE 802.16(g) for wireless radio-frequency networks, or an equivalent).

Although video image frames are typically handled at approximately 30 to 60 cycles per second in order to allow an observer to have the impression of continual image transmission, the data content of each image frame is very large. For example, digital video frames can have width and height pixel resolutions such as 1280×720, 1366×720, 1280×1080, 1920×1080, and so forth. Furthermore, the frames may either be progressive or interlaced scanned frames.

Figure 2:
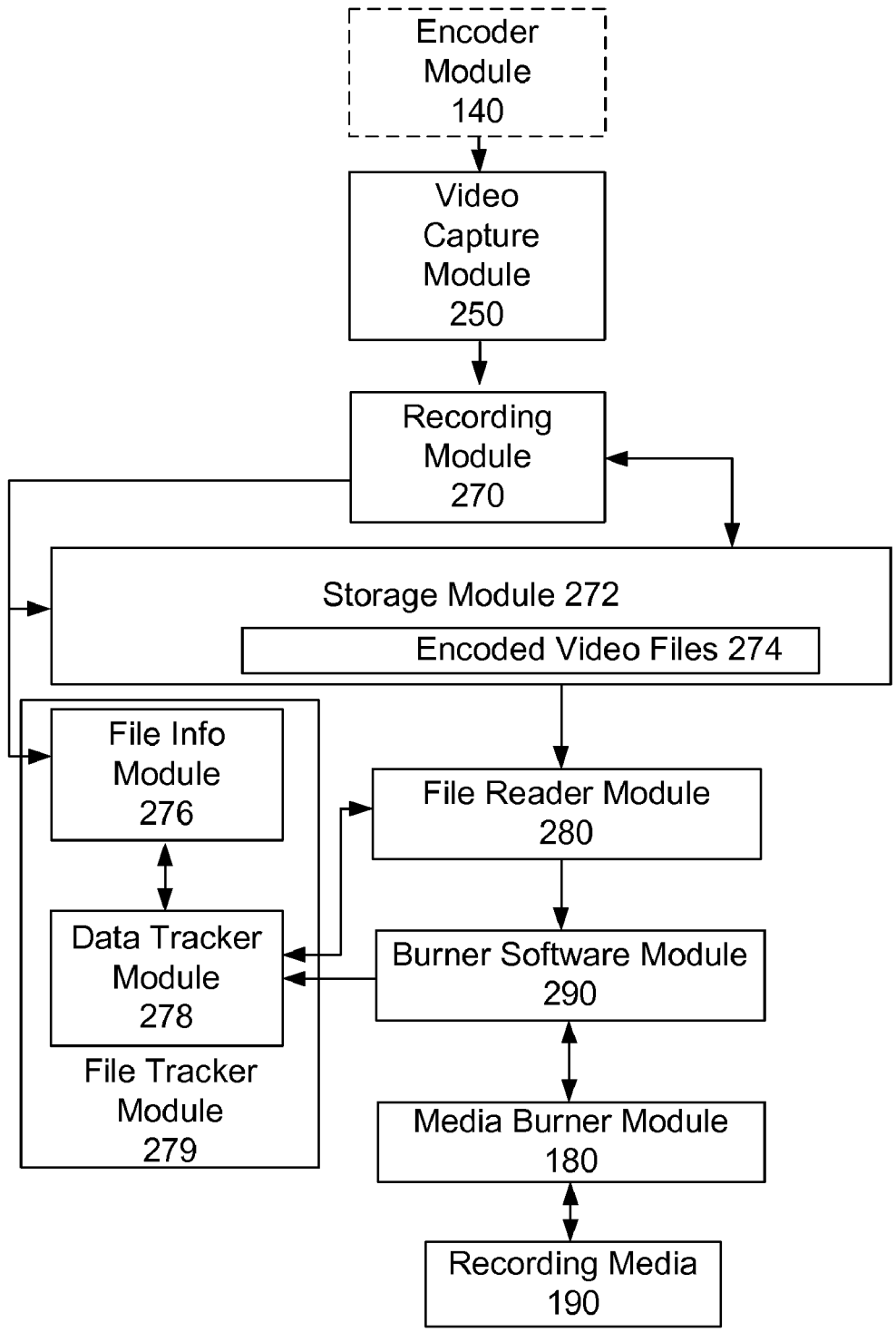
FIG. 2 illustrates a block diagram of a video recording system, in accordance with one embodiment of the invention.

FIG. 2 illustrates a block diagram of a video recording system, in accordance with one embodiment of the invention.

This system would typically reside within a data processing system (e.g., a personal computer, or an equivalent), or have some of the following modules externally connected to the data processing system. This system includes a video capture module 250, which receives an encoded video stream from an optional external encoder module (e.g., an MPEG-2 encoder module, or an equivalent encoder module) 140, a recording module 270 that organizes an encoded stream into video files and provides the encoded video stream and file organization information to a storage module 272, wherein the storage module 272 receives the encoded stream and file organization information from the recording module 270 and stores the encoded video stream in a set of one or more encoded video files 274, a file tracker module 279 including a file info module 276, and a data tracker module 278 to provide control signals and file info data to a file reader module 280, wherein the file reader module 280 reads sequential chunks of data from the encoded video files 274 and send the chunks of data in the same order to a burner software module 290, a media burner module 180 (e.g., a DVD burner, a CD burner, or an equivalent burner), and recording media 190 (e.g., a DVD, a CD, or an equivalent recordable media).

In one embodiment, the burner software module 290 would receive data from the file reader module 280 in order to operate the media burner module 180 to incrementally record chunks of video data to the media burner without knowing the extent of the recording session in advance. The burner software module 290 would also receive control signals from the file reader module 280 that will control the following actions: check if media burner module 180 has recording media 190 in it and the recording media 190 is adequate (is not defective, has reasonable amount of space left and is compatible in format) for recording of the video file; when to start a new title on the recording media 190 (by default file reader module 280 will signal start of a new title once it starts reading from a new file, unless this default action is overridden by the user); when to finalize a recording media 190 (by default file reader module 280 will signal to finalize the recording media 190 after the last chunk of the data from the last video file of the sequence maintained by the info module 276 was sent, unless this default action is overridden by the user). The media burner module 180 would typically be a standard and commercially available media burner module 180 (e.g., a DVD burner, a CD burner, or an equivalent burner).

In one embodiment, the recording module 270 provides encoded video stream and file organization information (such as when to start a new file and what is the file name, when to finalize the file if no more data is to be appended to it) to the storage module 272, and provides file name information to the file tracker module 279 in time sequential order as soon as a file is created by the storage module.

In one embodiment, the storage module 272 stores received encoded video stream to files based on the file organization information (such as, when to create a new file, when to stop appending data to a file and when to finalize the file) received from the recording module 270, and provides file information such as duration or extent in memory for the given file name to the file reader module.

In one embodiment, the file tracker module 279 performs several functions, such as the following—it stores file names in a sequence (i.e., in a queue) corresponding to their time of arrival from the recording module; it keeps track of what files have been successfully burned; it removes files from the queue either automatically when the file is successfully burned or it removes/adds files to a queue as instructed by a user; it keeps track where to resume burning within a file if a previous burning session was interrupted in the middle of the file (e.g., because of insufficient space on the recording media); and it provides file name information for the next file to burn (in the same order as they are put in the queue either automatically as file names arrive from the recording module or as reordered by the user) and the starting (resume) point within the file to the file reader module 280.

In one embodiment, the file reader module 280 sequentially reads data from encoded video files 274 and sends data to the burner software module 290, which in turn provides control and data information to the media burner module 180 to appropriately record at least one video file on the recording media 190. It should be noted that in one embodiment of the invention, the file reader module 280 can start reading data from a video file as soon as, or at any time after, the video file is created and its first data chunk is stored by the storage module 272; in this embodiment of the invention, the file reader module 280 doesn't have to wait until the entire video file was stored by the storage module 272 before it can start reading data from the file; the file reader module 280 will keep reading from the file as long as more data is being appended to the video file by the storage module 272, or as long as there is more data remaining until the end of the file that was already finalized by the storage module 272. It should be also noted that in one embodiment of the invention, one or more encoded video files can be selectively erased from the storage module 272 after the successful recording of the one or more encoded video files on the recording media 190, if no other copies are needed. The file info module 276 is updated by the data tracker module 278 as one or more encoded video files are deleted.

In one embodiment of the invention, if the recording media 190 turns out to be inadequate in memory capacity, or defective in some manner, the user would be prompted to replace the current recording media 190 with a new recording media 190. In one embodiment, the recording of the one or more video files would resume from the appropriate place within one of the encoded video files 274 on the storage module 272, and the user would not need to keep track of the breaks in the video files.

Figure 3:
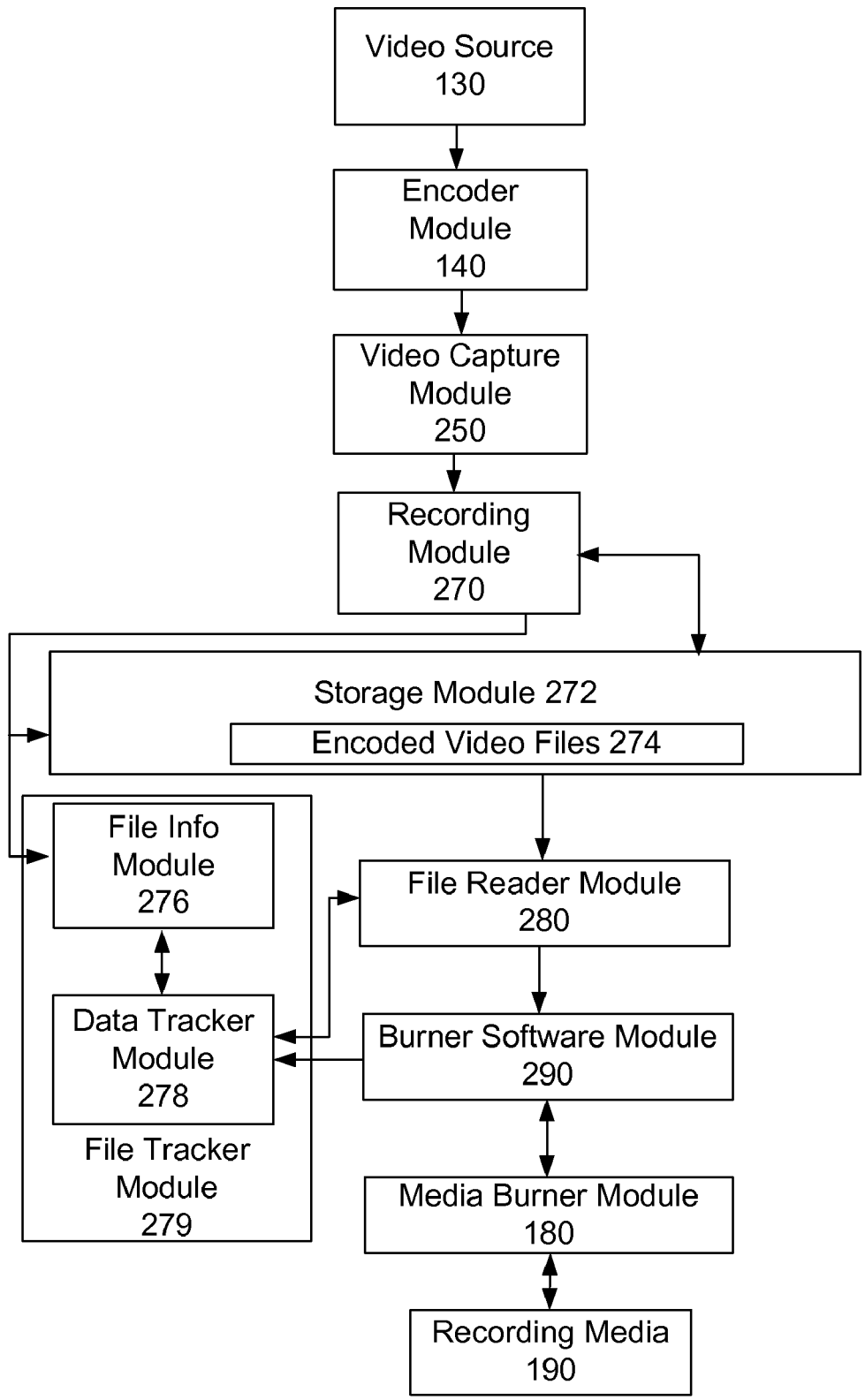
FIG. 3 illustrates a block diagram of a video recording system, in accordance with one embodiment of the invention.

In one embodiment of the invention, the video files provided by the recording module 270 are trans-coded (e.g., formatted in another format different to the original format, compressed in format, or changed in bit-rate, or any combination of the preceding, and so forth) to better match the limitations and capabilities of any intended recording media 190. In one embodiment, the recording module 270 does the trans-coding of one or more video files before they are stored on the storage module 272. In one embodiment, trans-coding is performed in real-time for the purpose of real-time transfer from the video source (a video source 130 is shown in FIG. 3) and encoder module 140 to the recording media 190. There are multiple choices for places where trans-coding can be performed. In one embodiment, trans-coding is performed in the encoder module 140 when the video source is a digital encoded video stream (i.e., the encoder module 140 is acting as an encoder and trans-coder module). In another embodiment, trans-coding is performed in the file reader module 280.

In one embodiment of the invention, when media is inserted in the burner, the media burner module notifies the data tracker module 278 that in turn checks if a video file is available, and if it is available it triggers the file reader module 280 to start reading data that initiates the burning of the video file. And/or when a video file is created by the storage module 272, the data tracker module 278 is notified by the recording module 270 and queries the media burner module 180 if recording media 190 is available in the media burner module 180, and if recording media 190 is available, it triggers the file reader module 280 to start reading data in order to start burning immediately. When a file is created by the storage module 272, the data tracker module 278 is notified and queries the media burner module 180 to determine if recording media 190 is available in the media burner module 180, and if it is not, the user is prompted to insert the recording media 190 in the media burner module 180 to start burning. When the last file from the sequence of files is burned, the recording media burning session is closed automatically (i.e., the recording media 190 is finalized) and the recording media 190 is ejected by the media burner module 180.

In one embodiment of the invention, there is a default action associated with the following events. When the first file in the sequence of files is created and if recording media 190 is available in the media burner module 180, the burning starts right away. When the recording media 190 is inserted in the media burner module 180 and the sequence of files contains at least one file that contains data that wasn't burned yet, the burning starts automatically. When the last file of the sequence of files is burned, the burning session is closed and recording media 190 is finalized and ejected. In one embodiment of the invention, the data tracker module 278 activates the file reader module 280 to resume sending data to the burner software module 290 when a new file gets created and if recording media is available. In one embodiment of the invention, when new media is inserted in the media burner module 180, the burner software module 290 notifies the data tracker module 278, that in turn checks if there is a file available and if there is, the data tracker module 278 activates the file reader module 280 to start providing data to the burner software module 290. In other words, for one embodiment requiring minimal user intervention, the recording media 190 burning process starts as soon as these two conditions are satisfied: there is a video file available to burn and there is recording media 190 in the media burner module 180.

In one embodiment of the invention, the user can control how each of the preceding default actions are executed. The user is prompted whether the action has to be taken, and the action is not taken until the user responds. In one embodiment of the invention, the user is prompted whether the action has to be taken and the action is taken when either the user responds or a certain time out expires, whichever happens the earliest. In one embodiment of the invention, action is taken without asking the user.

FIG. 3 illustrates a block diagram of a video recording system, in accordance with one embodiment of the invention. This system includes a video source (e.g., analog or digital video source, such as video camera, cable, satellite dish, wireless source of video, or an equivalent) 130, an encoder module 140, a video capture module 250, which receives encoded video stream from the encoder module (e.g., an MPEG-2 encoder module, or an equivalent encoder module) 140, a recording module 270 that organizes encoded stream into video files and provides the encoded video stream and file organization information to a storage module 272, wherein the storage module 272 receives encoded video stream and file organization information from the recording module 270 and stores the encoded video stream in a set of one or more encoded video files 274, a file tracker module 279 including a file info module 276, and a data tracker module 278 to provide control signals and file info data to a file reader module 280, wherein the file reader module 280 reads sequential chunks of data from the encoded video files 274 and sends the chunks of data in the same order to a burner software module 290, burner module 180, and recording media 190. The data tracker module 278 also provides control signal information and file information to the file reader module 280 in order to start reading video file data and sending it to the burner module 290 at the appropriate time when one or more video files are sufficiently available to record on the recording media 190.

The input data from the video source 130 can either have an analog format (e.g., component video, Video Graphics Array (VGA), or an equivalent) or a digital format (e.g., High-Definition Multimedia Interface (HDMI), Digital Visual Interface (DVI), IEEE 1394 (FireWire), Serial Digital Interface (SDI), High Definition Serial Digital Interface (HD-SDI), TOSLINK® optical, EIAJ optical, ADAT optical, composite coax digital, or an equivalent).

In one embodiment, the recording module 270 includes a data processing system (e.g., a personal computer, or an equivalent). The storage module 272 can have any type of writable and readable memory itself (e.g., one or more magnetic hard disk drives, magneto-optical disks, video disks, flash memory, or equivalents). The storage module 272 typically includes a non-volatile memory or volatile memory large enough in capacity to hold enough video data to start a recording session to a recording media. It should be noted that in one embodiment of the invention, that one or more encoded video files can be selectively erased from the storage module 272 after the successful recording of the one or more encoded video files on the recording media 190, if no other copies are needed. The file info module 276 is updated by the data tracker module 278 as one or more encoded video files are deleted from the storage module 272.

If the recording media 190 turns out to be inadequate in memory capacity, or defective in some manner, the user would be prompted to replace the current recording media 190 with a new recording media 190. In one embodiment, the recording of the one or more video files would resume from the appropriate place in the encoded video files 274 within the storage module 272, and the user would not need to keep track of the breaks in the one or more video files.

Figure 4:
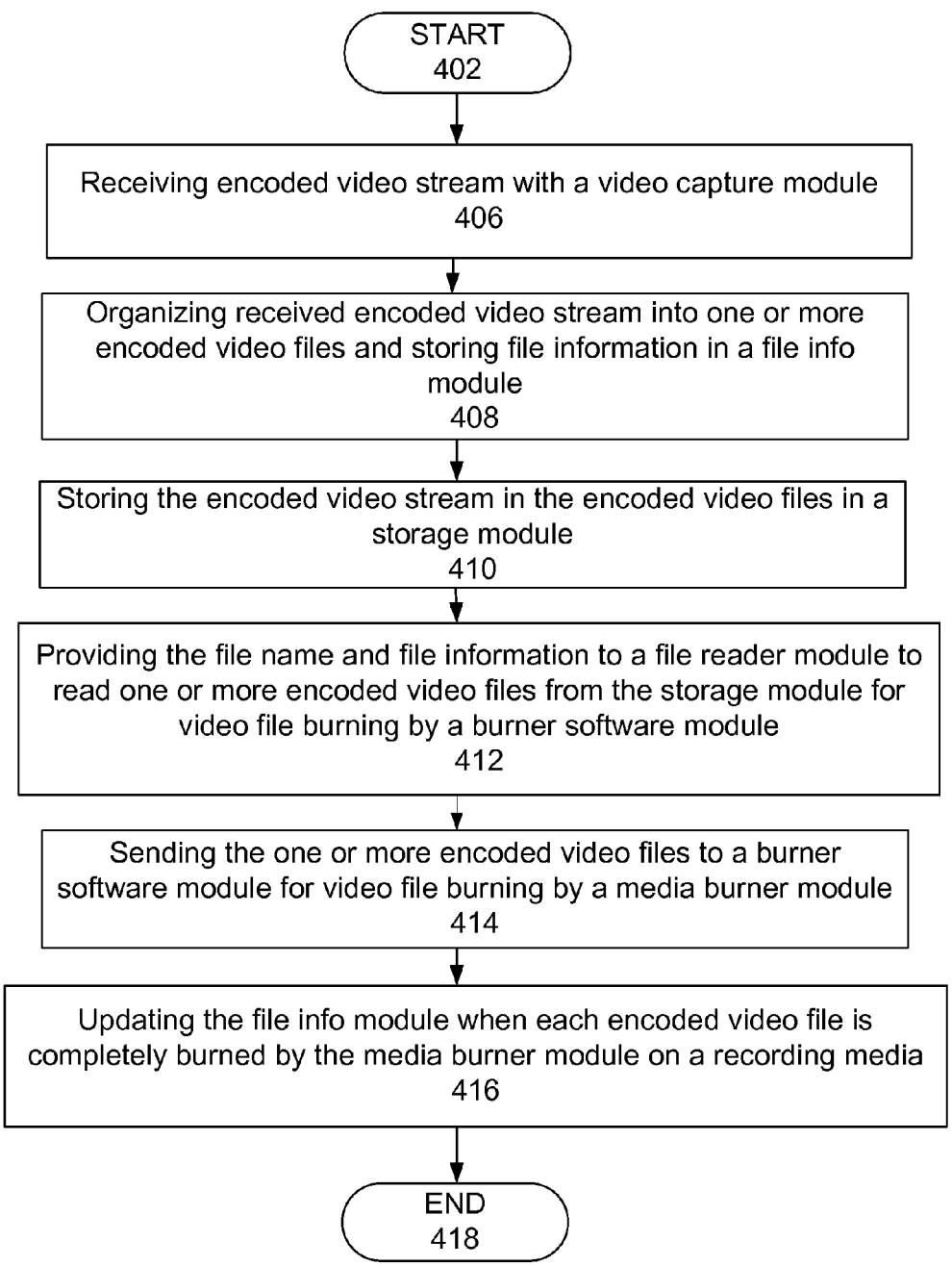
FIG. 4 illustrates a flowchart of a method to operate a video recording system, in accordance with one embodiment of the invention.

FIG. 4 illustrates a flowchart of a method to operate a video recording system, in accordance with one embodiment of the invention. The method starts in operation 402. Operation 406 is next and includes receiving encoded video stream with a video capture module. Operation 408 is next and includes organizing of the received encoded video stream into one or more encoded video files in a storage module and storing file name information in a file info module. Operation 410 is next and includes storing the encoded video stream in the encoded video files in a storage module. Operation 412 is next and includes providing the file name and file info to a file reader module to read one or more encoded video files from the storage module for video file burning by a burner software module. Operation 414 is next and included sending data to a burner software module for encoded video file burning by a media burner module. Operation 416 is next and includes updating the file info module when each encoded video file is completely burned by the media burner module on the recording media. The method ends in operation 418. It should be noted that in one embodiment of the invention, that one or more encoded video files can be selectively erased from the storage module after the successful recording of the one or more encoded video files on the recording media, if no other copies are needed. The file info module would need to be updated accordingly if one or more encoded video files are deleted.

Figure 5:
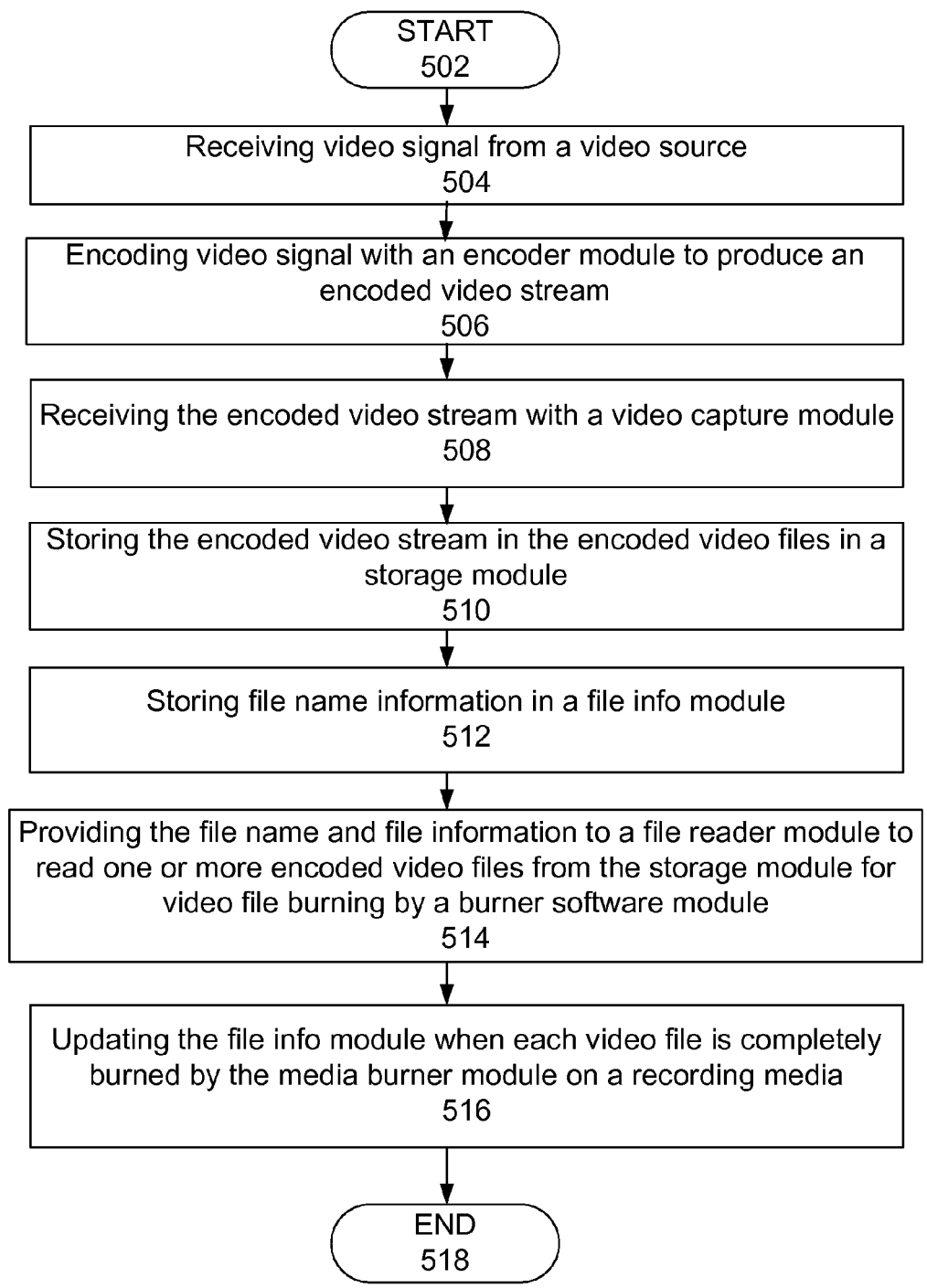
FIG. 5 illustrates a flowchart of a method to operate a video recording system, in accordance with one embodiment of the invention.

FIG. 5 illustrates a flowchart of a method to operate a video recording system, in accordance with one embodiment of the invention. The method starts in operation 502. Operation 504 is next and includes receiving video signal from a video source. Operation 506 is next and includes encoding video signal with an encoder module to produce an encoded video stream. Operation 508 is next and includes receiving the encoded video stream with a video capture module. Operation 510 is next and includes storing the one or more encoded video files in a storage module. Operation 512 is next and includes storing file name information in a file info module. Operation 514 is next and includes providing the file name and file information to a file reader module to read one or more encoded video files from the storage module for video file burning by a burner software module. Operation 516 is next and includes updating the file info module when each encoded video file is completely burned by the media burner module on the recording media. The method ends in operation 518.

Figure 6:
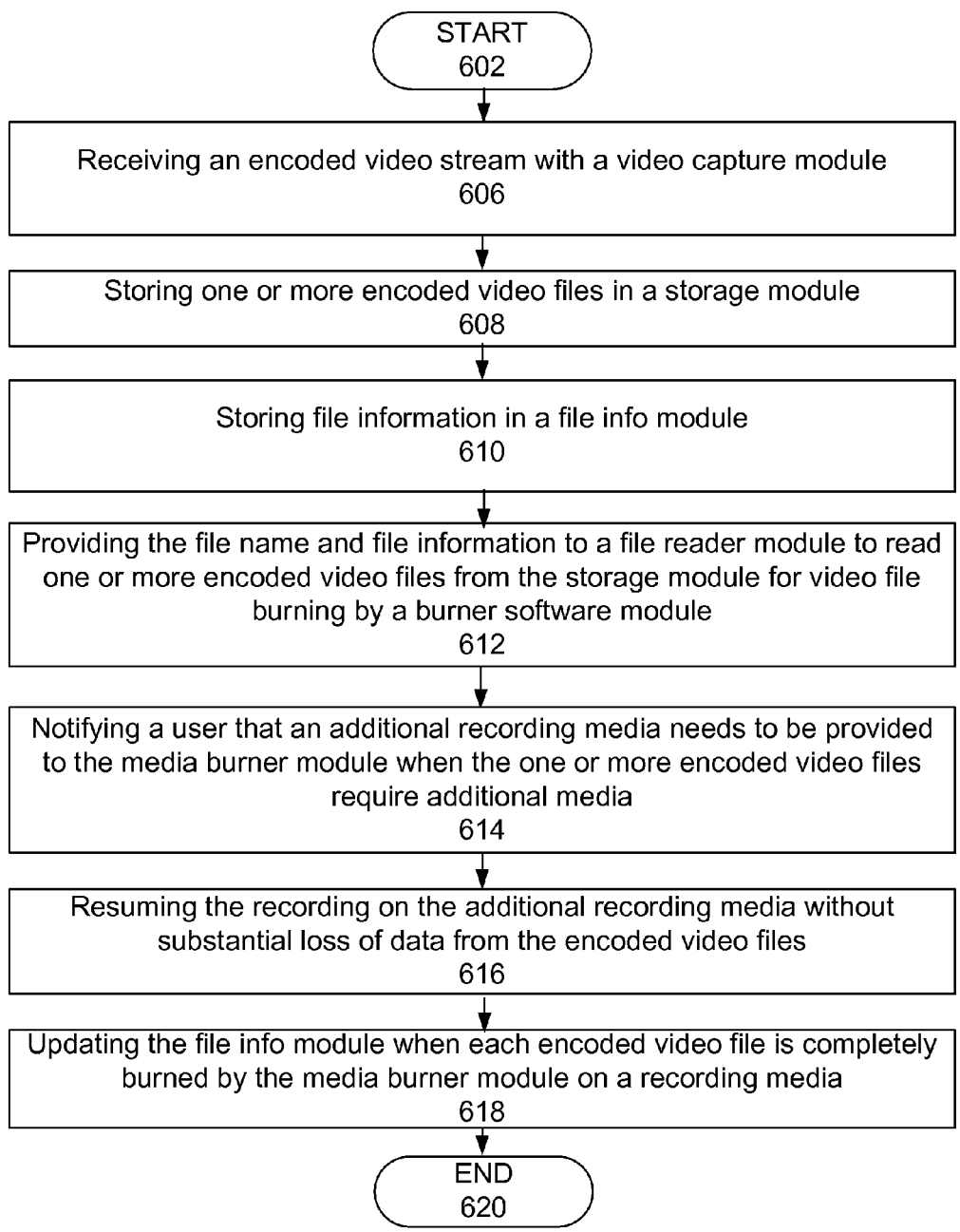
FIG. 6 illustrates a flowchart of a method to operate a video recording system, in accordance with one embodiment of the invention.

FIG. 6 illustrates a flowchart of a method to operate a video recording system, in accordance with one embodiment of the invention. The method starts in operation 602. Operation 606 is next and includes receiving an encoded video stream with a video capture module. Operation 608 is next and includes storing one or more encoded video files in a storage module. Operation 610 is next and includes storing file name information in a file info module. Operation 612 is next and includes providing the file name and file information to a file reader module to read one or more encoded video files from the storage module for video file burning by a burner software module. Operation 614 is next and includes notifying a user that an additional recording media needs to be provided to the media burner module when the one or more encoded video files require additional media. Operation 616 is next and includes resuming the recording on the additional recording media without substantial loss of the data from encoded video files. Operation 618 is next and includes updating the file info module when each encoded video file is completely burned by the media burner module on the recording media. The method ends in operation 620.

Figure 7:
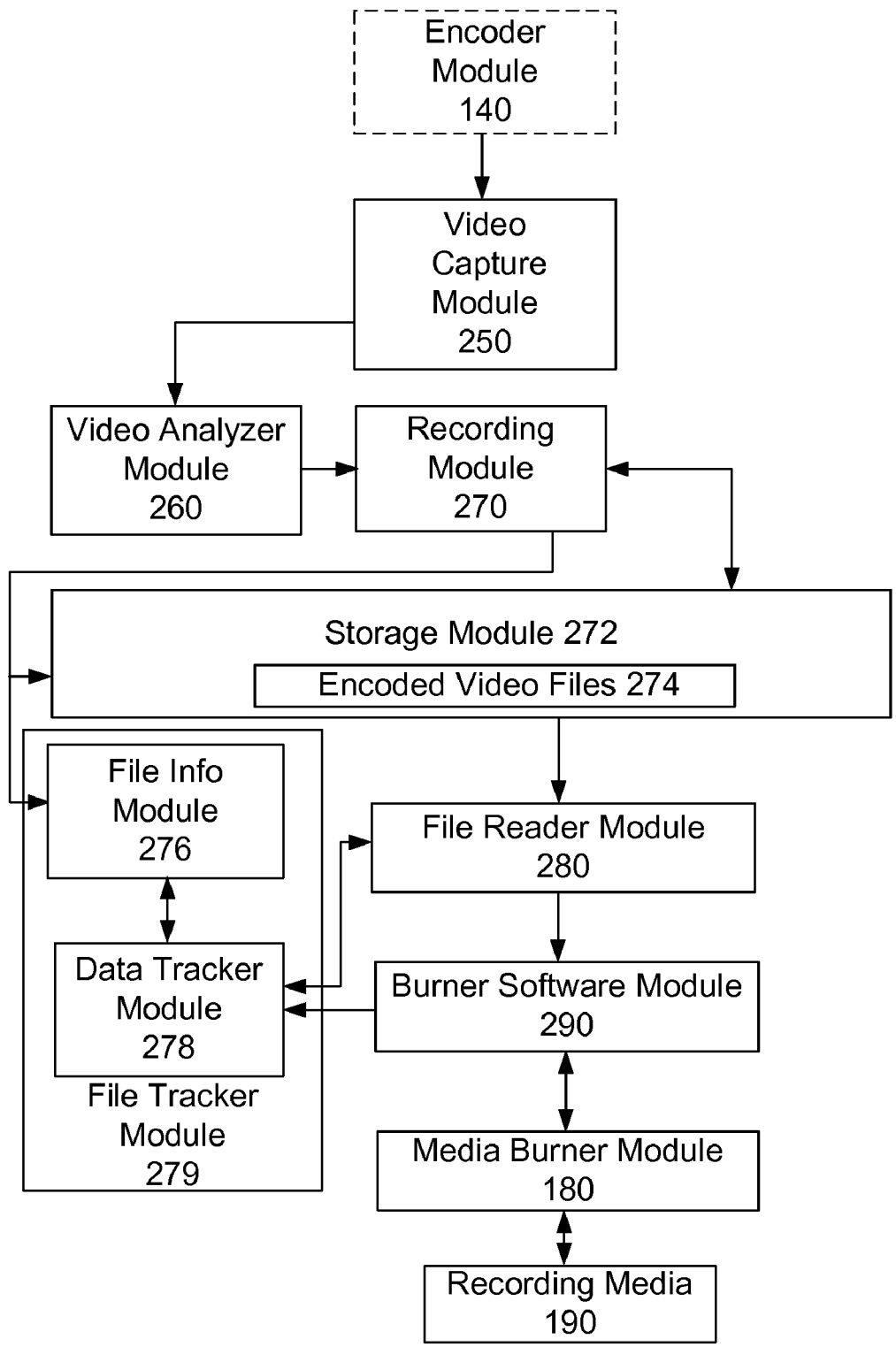
FIG. 7 illustrates a block diagram of a video recording system, in accordance with one embodiment of the invention.

FIG. 7 illustrates a block diagram of a video recording system, in accordance with one embodiment of the invention. This system includes a video capture module 250, which receives encoded video stream from an encoder module (e.g., an MPEG-2 encoder module, or an equivalent encoder module) 140, a video analyzer module 260 that analyzes the video stream output of the video capture module 250, a recording module 270 that organizes the received encoded video stream into the video files, a storage module 272 that receives encoded stream and file organization information from the recording module 270 and stores the encoded video stream in the one or more encoded video files 274, a file tracker module 279 including a file info module 276, and a data tracker module 278 to provide control signals and file info data to a file reader module 280, a burner software module 290, a media burner module 180, and recording media 190.

In the embodiment illustrated in FIG. 7, the video analyzer module 260 analyzes the output of the video capture module 250 to detect meaningful video images. In one embodiment of the invention, the video analyzer module 260 detects and discards video images that are static monochromatic video images (e.g., blue screens, and equivalents) and/or video images that are merely electronic noise (e.g., white noise, or equivalents indicating the absence of an actual video signal). In one embodiment, the user would be able to selectively choose what type of video images the video analyzer module 260 would consider meaningful and worthwhile for recording.

Meaningful video images would be output from the video analyzer module 260 to the recording module 270 for processing as previously discussed. Meaningful video files would be stored in the storage module 272. The data tracker module 278 provides file names, file position info and control signal information to the file reader module 280 in order to start the reading video file data and sending it to the burner module 290 at the appropriate time when one or more video files are sufficiently available to record on the recording media 190.

If the recording media 190 turns out to be inadequate in memory capacity, or defective in some manner, the user would be prompted to replace the current recording media 190 with a new recording media 190. In one embodiment, the recording of the one or more video files would resume from the appropriate place in the encoded video files 274 within the storage module 272, and the user would not need to keep track of the breaks in video files.

Figure 10:
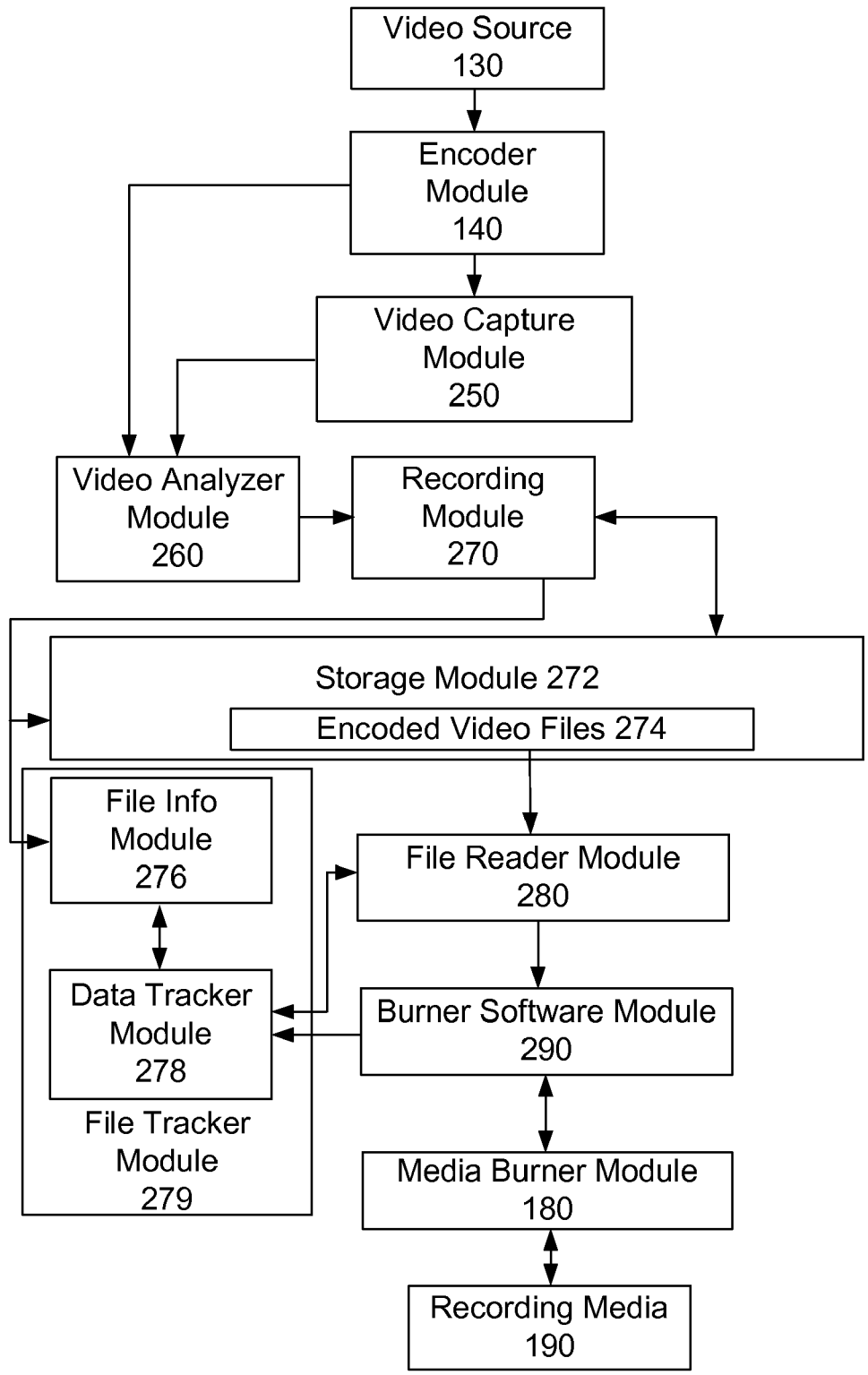
FIG. 10 illustrates a block diagram of a video recording system, in accordance with one embodiment of the invention.

The video files provided by the recording module 270 can optionally be trans-coded (e.g., formatted in another format different to the original format, compressed in format, or changed in bit-rate, or any combination of the preceding, and so forth) to better match the intended uses of the recording media 190. In one embodiment, the recording module 270 does the trans-coding of the video stream before they are stored on the storage module 272. In one embodiment, trans-coding is performed in real time for the purpose of real-time transfer from the video source (a video source 130 is shown in FIG. 10) and encoder module 140 to the recording media 190. There are multiple choices for places where trans-coding can be performed. In one embodiment, trans-coding is performed in the encoder module 140 when the video source is a digital encoded video stream (i.e., the encoder module 140 is acting as an encoder and trans-coder module). In another embodiment, trans-coding is performed in the file reader module 280.

Figure 8:
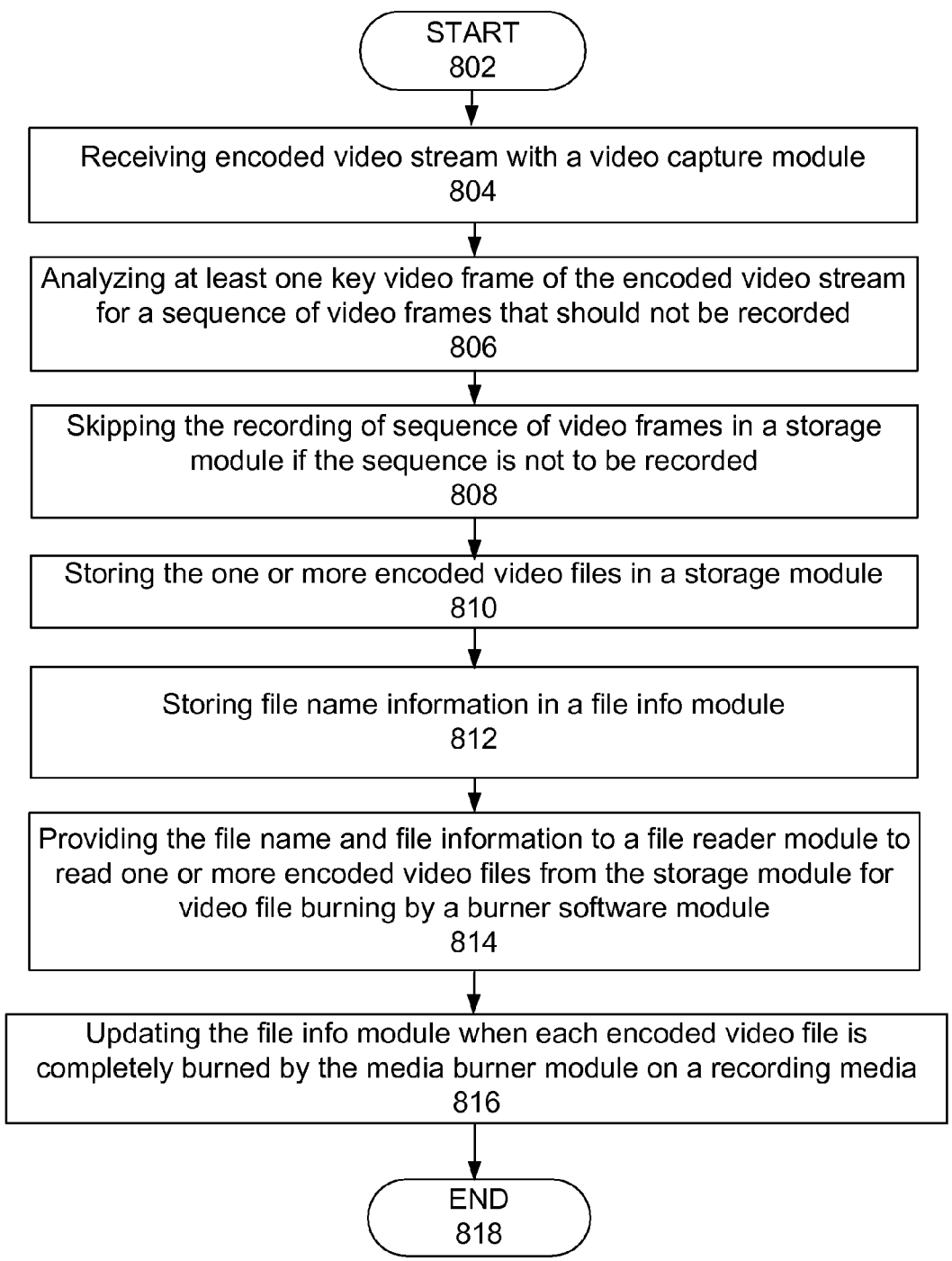
FIG. 8 illustrates a flowchart of a method to operate a video recording system, in accordance with one embodiment of the invention.

FIG. 8 illustrates a flowchart of a method to operate a video recording system, in accordance with one embodiment of the invention. The method starts in operation 802. Operation 804 is next and includes receiving an encoded video stream with a video capture module. Operation 806 is next and includes analyzing at least one key video frame of the encoded video stream for a sequence of video frames that should not be recorded (e.g., because it is a static monochromatic video frame or has video noise instead of video signal, and so forth). Operation 808 is next and includes skipping the recording of sequence of video frames in a storage module if the sequence is not to be recorded. Operation 810 is next and includes storing the one or more encoded video files in a storage module. Operation 812 is next and includes storing video file name information in a file info module. Operation 814 is next and includes providing the file name and file information to a file reader module to read one or more encoded video files from the storage module for video file burning by a burner software module. Operation 816 is next and includes updating the file info module when each encoded video file is completely burned by the media burner module on the recording media. The method ends in operation 818.

Figure 9:
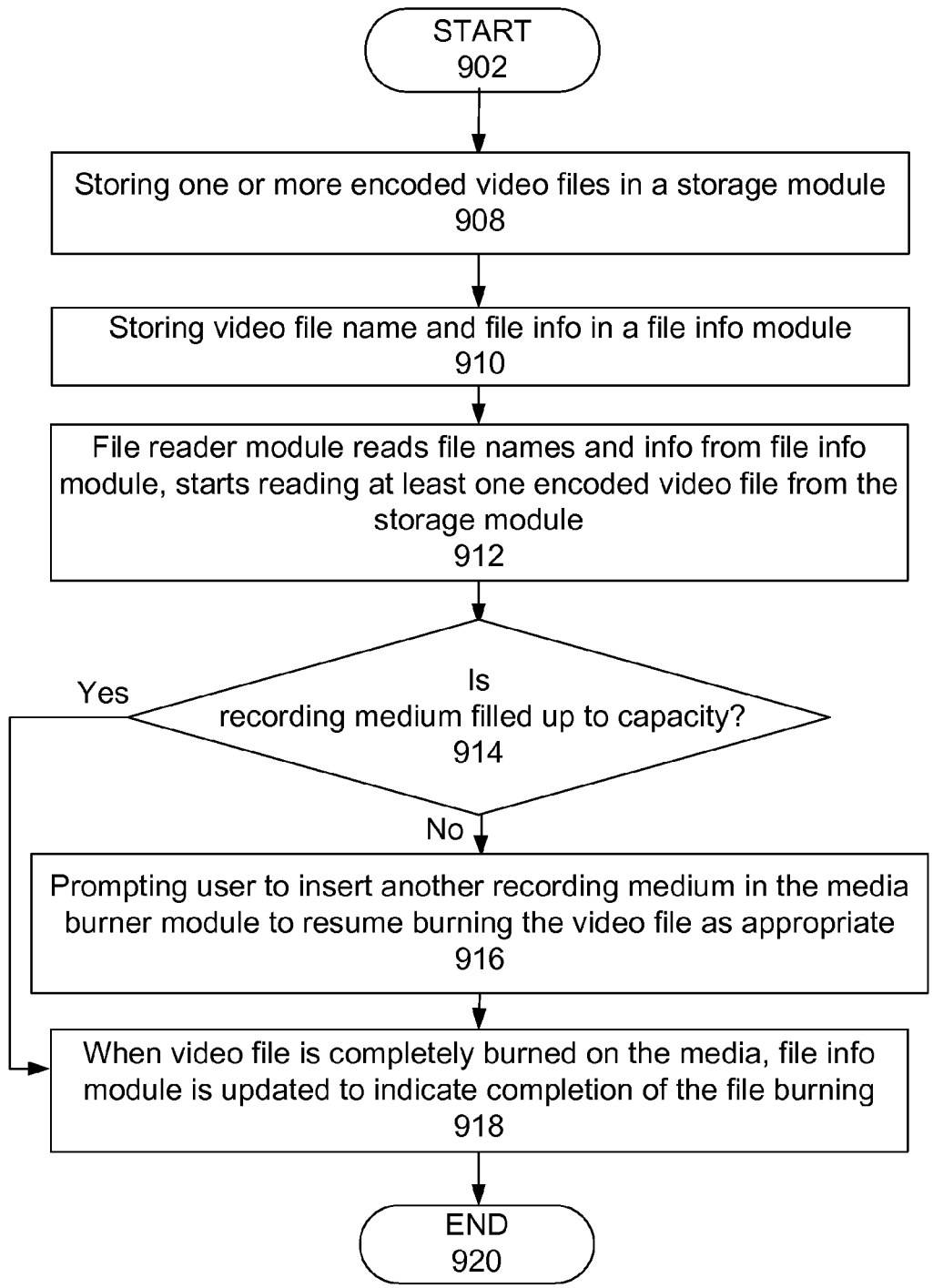
FIG. 9 illustrates a flowchart of a method to operate a video recording system, in accordance with one embodiment of the invention.

FIG. 9 illustrates a flowchart of a method to operate a video recording system, in accordance with one embodiment of the invention. The method starts in operation 902. Operation 908 is next and includes storing the encoded video files in a storage module. Operation 910 is next and includes storing video file name and file info in a file info module. Operation 912 is next and includes reading video file name and file info from the file info module and reading at least one encoded video file from the storage module by the file reader module. Operation 914 is next and includes a test to determine if the recording medium has any more space available or adequate for recording (e.g., insufficient or defective). If the answer to this test is "No," then operation 916 is next. Operation 916 includes prompting the user to insert another recording medium in the media burner module to resume burning the file as appropriate (starting from the beginning again if the previous medium was defective, or starting from a break point if the previous medium simply ran out of capacity). If the answer to the test of operation 914 is "Yes," then operation 918 is next. Operation 918 includes updating the file info module to indicate completion of the video file burning when the encoded video file is completely burned on the media. The method ends in operation 920.

FIG. 10 illustrates a block diagram of a video recording system, in accordance with one embodiment of the invention. This system includes a video source 130, an encoder module 140, a video capture module 250, which receives an encoded video stream from the encoder module 140 (e.g., an MPEG-2 encoder module, or an equivalent encoder module), a video analyzer module 260 that analyzes the video stream output of the video capture module 250, a recording module 270 that organizes received encoded video stream into the video files, a storage module 272 that receives encoded stream and file organization information from the recording module 270 and stores the encoded video stream in the one or more encoded video files 274, a file tracker module 279 including a file info module 276, and a data tracker module 278 to provide control signals and file info data to a file reader module 280, a burner software module 290, a media burner module 180, and recording media 190.

In one embodiment of the system illustrated in FIG. 10, the encoder module 140 notifies video analyzer module 260 if there is valid video signal at the input of the encoder module. Video analyzer module 260 will discard all video stream arriving from the video capture module until it's notified by the encoder module that valid video signal has arrived from the video source module. In another embodiment illustrated in FIG. 10, the video analyzer module 260 analyzes the output of the video capture module 250 to detect meaningful video images. In one embodiment of the invention, the video analyzer module 260 detects and discards video images that are static monochromatic video images (e.g., blue screens, and equivalents) and/or video images that are merely electronic noise (e.g., white noise, or equivalents indicating the absence of an actual video signal). In one embodiment, the user would be able to selectively choose what type of video images the video analyzer module 260 would consider meaningful and worthwhile for recording.

Meaningful video images would be output from the video analyzer module 260 to the recording module 270 for processing as previously discussed. Meaningful video files would be stored in the storage module 272, which would store each encoded video file, and the encoded video file name and info are provided to the file info module 276. The data tracker module 278 reads the file info module 276 and provides control signals and data to file reader module 280 to enable burner software module 290 and the burner module 180 to appropriately record each encoded video file on the recording media 190. The data tracker module 278 also provides control signal information and data to the file reader module 280 in order to start the reading encoded video file data and sending it to the burner module 290 at the appropriate time when one or more encoded video files are sufficiently available to record on the recording media 190.

If the recording media 190 turns out to be inadequate in memory capacity, or defective in some manner, the user would be prompted to replace the current recording media 190 with a new recording media 190. In one embodiment, the recording of the one or more encoded video files would resume from the appropriate place in the encoded video files 274 within the storage module 272, and the user would not need to keep track of the breaks in video files.

Figure 11:
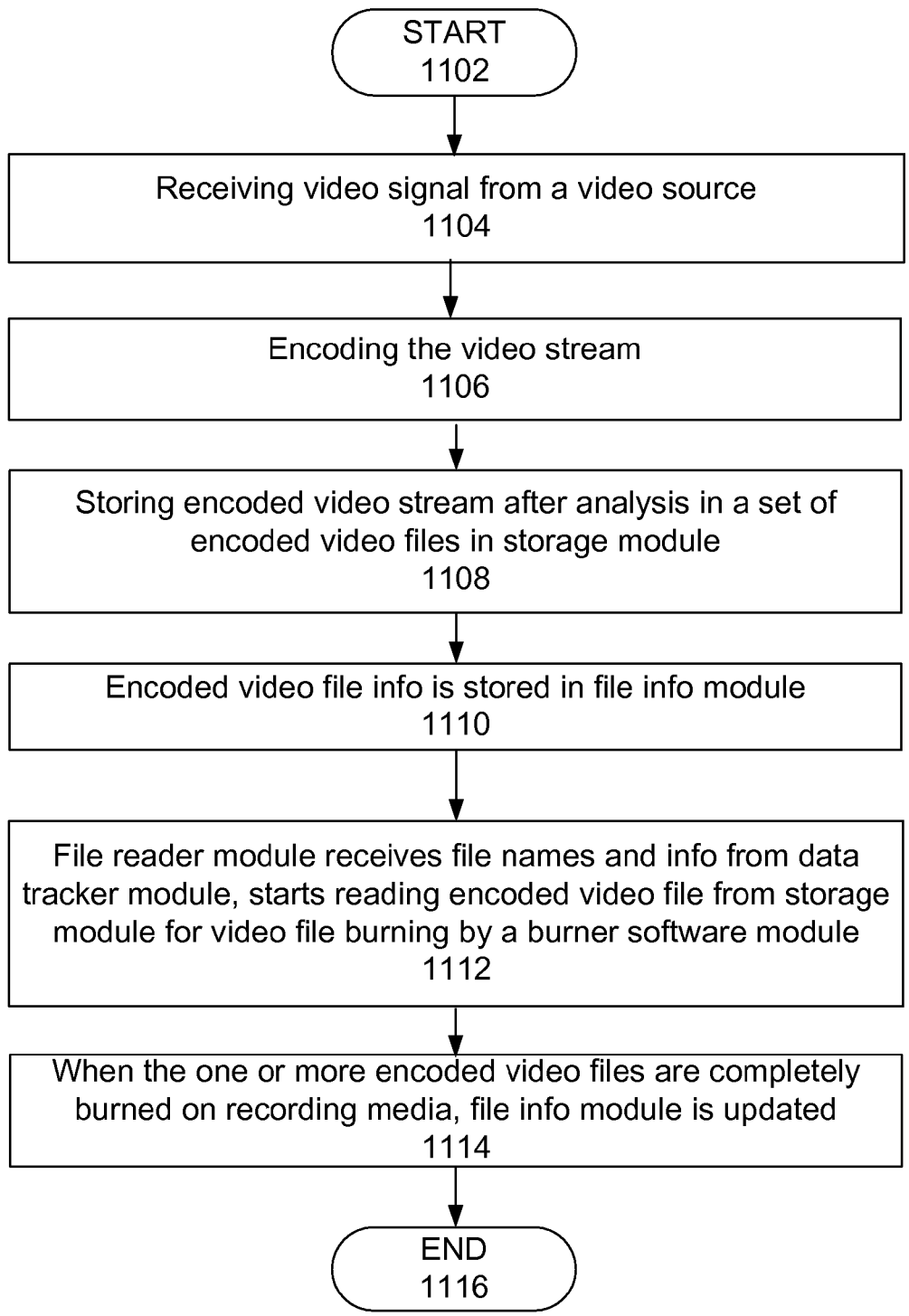
FIG. 11 illustrates a flowchart of a method to operate a video recording system, in accordance with one embodiment of the invention.

FIG. 11 illustrates a flowchart of a method to operate a video recording system, in accordance with one embodiment of the invention. The method starts in operation 1102. Operation 1104 is next includes receiving video signal from a video source (e.g., an analog or digital source, as discussed above). Operation 1106 is next and includes encoding the video stream. Operation 1108 is next and includes storing the one or more encoded video files after analysis in a storage module. Operation 1110 is next and includes storing encoded video file name and file info in a file info module. Operation 1112 is next and includes receiving each encoded video file name and file info from the file info module by way of a data tracker module and enabling a file reader module to read each encoded video file from the storage module for encoded video file burning by a burner software module. Operation 1114 is next and includes updating the file info module when the one or more encoded video files are completely burned on the recording media. The method ends in operation 1116.

Figure 12:
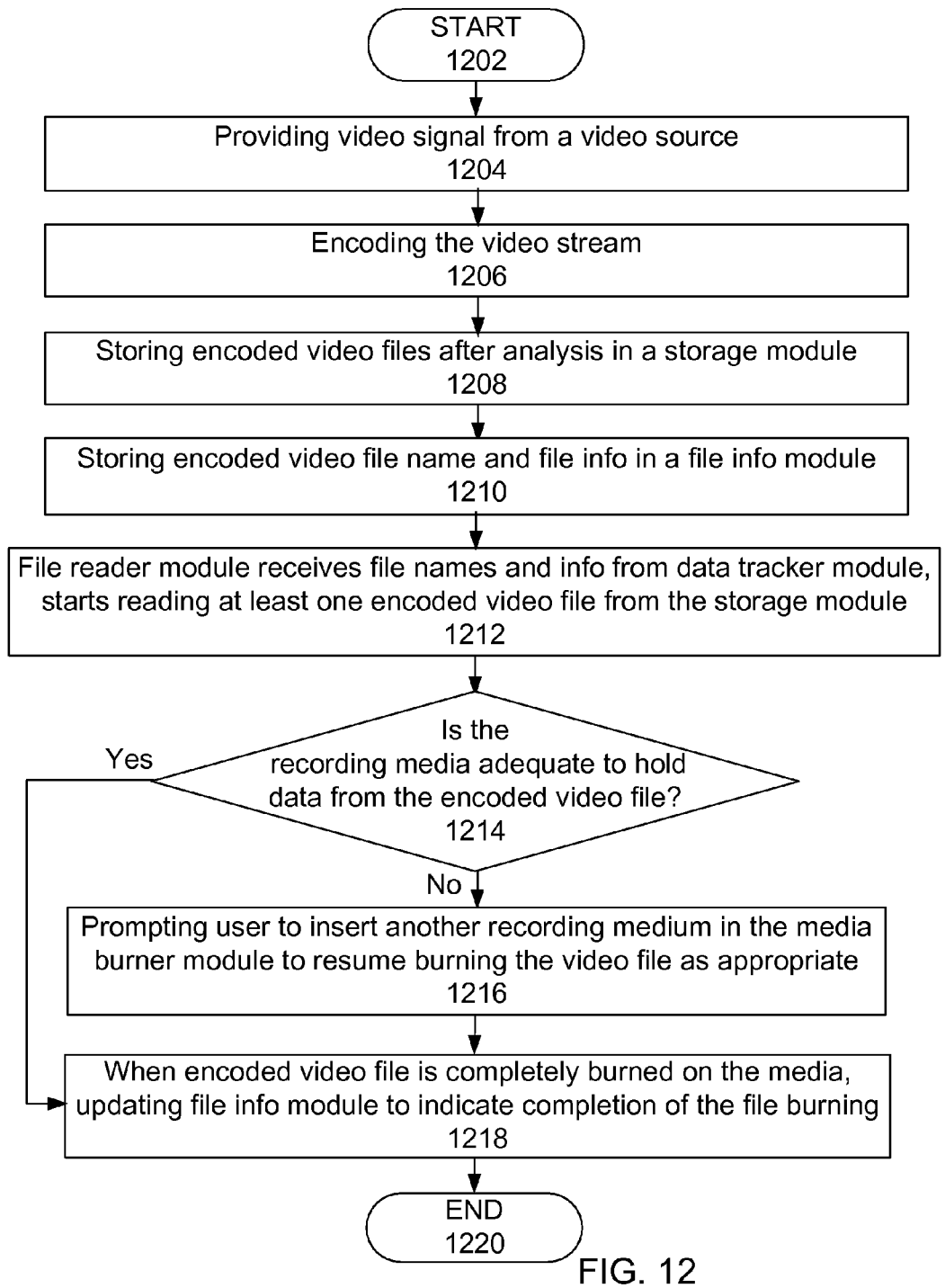
FIG. 12 illustrates a flowchart of a method to operate a video recording system, in accordance with one embodiment of the invention.

FIG. 12 illustrates a flowchart of a method to operate a video recording system, in accordance with one embodiment of the invention. The method starts in operation 1202. Operation 1204 is next and includes providing video signal from a video source. Operation 1206 is next and includes encoding the video stream. Operation 1208 is next and includes storing the one or more encoded video files after analysis (e.g., analysis for valid video signal, for video frames with video noise, monochromatic video frames, and so forth) in a storage module. Operation 1210 is next and includes storing encoded video file name and file info in a file info module. Operation 1212 is next and includes receiving each encoded video file name and file info from the file info module from a data tracker module and enabling a file reader module to read at least one encoded video file from the storage module. Operation 1214 is next and includes a test to determine if the recording media is adequate in capacity (or if the recording is defective) to hold any more data from the encoded video file. If the answer to this test is "No," then operation 1216 is next. Operation 1216 includes prompting the user to insert another recording medium in the media burner module to resume burning the encoded video file as appropriate (starting from the beginning of the one or more encoded video files again if the previous recording medium was defective, or starting from a break point if the previous recording medium simply lacked enough capacity). Then operation 1218 would be next. If the answer to the test of operation 1914 is "Yes," then operation 1218 is next. Operation 1218 includes updating the file info module to indicate completion of the encoded video file burning when the encoded video file is completely burned on the media. The method ends in operation 1220.

For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Several embodiments of the invention are possible. The exemplary embodiments described herein are for purposes of illustration and are not intended to be limiting. Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Therefore, those skilled in the art will recognize that other embodiments could be practiced without departing from the scope and spirit of the claims set forth below.

What is claimed is:

1. A method to record one or more encoded video files on a recording media, comprising:
   receiving an encoded video stream with a video capture module;
   analyzing at least one key video frame of the encoded video stream to detect meaningful video images;
   skipping any storing in a storage module of a sequence of video frames of the encoded video stream if at least one meaningful video image is not detected in the at least one key video frame of the encoded video stream;
   storing the encoded video stream in the storage module, wherein the encoded video stream is organized as one or more encoded video files;
   storing a file name and file information of the one or more encoded video files in a file info module;
   providing the file name and file information to a file reader module that reads the encoded video stream from the file and sends the encoded video stream to a burner software module that operates a media burner module;
   controlling the file reader module with a data tracker module, wherein the data tracker module controls one or more operations of the file reader module; and
   updating the file info module as the one or more encoded video files are successfully recorded on a recording media by the media burner module.

2. The method of claim 1, further comprising:
   notifying a user that an additional recording media needs to be provided to the media burner module when the one or more encoded video files require an additional recording media to successfully record the one or more encoded video files; and
   resuming the recording of the one or more encoded video files on the additional recording media without loss of any substantial portion of the one or more encoded video files, when the user provides the additional recording media.

3. The method of claim 1, further comprising:
   receiving video signal from a video source; and
   encoding the video stream with an encoder to produce the one or more encoded video files.

4. The method of claim 1, further comprising:
   analyzing at least one key video frame of encoded video stream for a static monochromatic video frame; and
   skipping the recording in the storage module a sequence of video frames of an encoded video stream if the sequence of video frames is substantially a static monochromatic image.

5. The method of claim 1, further comprising:
   analyzing at least one key video frame of encoded video stream for a video frame containing video noise; and
   skipping the recording in the storage module of a sequence of video frames of an encoded video stream if the sequence of video frames substantially includes video noise.

6. The method of claim 1, wherein the one or more encoded video files recorded on the recording media includes a trans-coded version of at least one encoded video file.

7. The method of claim 6, wherein the trans-coded version of the at least one encoded video file includes one or more trans-codings selected from the group of trans-codings consisting of: formatting the at least one encoded video file in another format different to the original encoded video stream format, compressing the at least one encoded video file in format, and changing the at least one encoded video file in bit-rate.

8. The method of claim 1, wherein the one or more encoded video files can be selectively erased from the storage module after successful recording of the one or more encoded video files on the at least one recording media.

9. A system to record one or more encoded video files on a recording media, comprising:
   a video capture module to receive an encoded video stream;
   a recording module to organize recording of the encoded video stream into encoded video files;
   a storage module coupled to the recording module, wherein the storage module can store one or more encoded video files to record the encoded video stream;
   a video analyzer module for analyzing at least one key video frame of the encoded video stream to detect meaningful video images, and skipping any storing in the storage module of a sequence of video frames of the encoded video stream if at least one meaningful video image is not detected in the at least one key video frame of the encoded video stream;
   a file reader module to read data from one or more encoded video files and send the one or more encoded video files to the burner software module
   a burner software module to operate a media burner module to record the one or more encoded video files on at least one recording media; and
   a file info module to provide to the file reader module the one or more file names and file information from the one or more encoded video files; and
   a data tracker module to update the file info module as the one or more encoded video files are successfully recorded on at least one recording media, wherein the data tracker module provides one or more timing control signals to the file reader module to send video data to the burner software module.

10. The system of claim 9, further comprising:
    a trans-coding module within the file reader module, wherein the trans-coding module can change the encoding of the one or more encoded video files before they are recorded on at least one recording media.

11. The system of claim 9, further comprising:
    an encoder module to encode a video signal provided by a video source into an encoded video stream to output to the video capture module.

12. The system of claim 11, further comprising:
    a video source coupled to the encoder module so that the encoder module will encode video stream and output an encoded video stream to the video capture module.

13. The system of claim 9, wherein the file info module and the data tracker module are combined into one file tracker module.

14. The system of claim 9, wherein the storage module can selectively provide a trans-coded version of at least one encoded video file from the one or more encoded video files.

15. The system of claim 14, wherein the trans-coded version of the at least one encoded video file includes one or more trans-codings selected from the group of trans-codings consisting of: formatting the at least one encoded video file in another format different to the original encoded video stream format, compressing the least one encoded video file in format, and changing the at least one encoded video file in bit-rate.

16. The system of claim 9, wherein the encoded video stream is provided by one or more wireless devices.

17. A method to record one or more video files on a recording media, comprising:
receiving video signal from a video source;
encoding the video source with an encoder coupled to the video source;
receiving an encoded video stream at a video capture module;
analyzing at least one key video frame of the encoded video stream to detect meaningful video images;
skipping any storing in a storage module of a sequence of video frames of the encoded video stream if at least one meaningful video image is not detected in the at least one key video frame of the encoded video stream;
storing the encoded video stream in the storage module having a set of one or more encoded video files;
storing the file name and file information of the one or more encoded video files in the file info module;
providing the file name and file information of the one or more encoded video files to a file reader module that provides the one or more video encoded files to a burner software module, wherein when a new recording media is inserted in a media burner module, the burner software module notifies a data tracker module, that in turn checks if there is an encoded video file available and if it is available, the data tracker module activates the file reader module to start sending data to the burner software module; and
updating the file info module as the one or more encoded video files are successfully recorded on a recording media by the media burner module.

18. The method of claim 17, further comprising:
notifying a user that an additional recording media needs to be provided to the media burner module when the one or more encoded video files require an additional recording media to successfully record the one or more encoded video files; and
resuming the recording of the one or more encoded video files on the additional recording media without loss of any substantial portion of the one or more encoded video files, when the user provides an additional recording media.

19. The method of claim 17, further comprising:
analyzing at least one video frame of an encoded video stream for a static monochromatic video frame; and
skipping the recording in the storage module of the at least one video frame of the encoded video stream if the at least one video frame is substantially a static monochromatic video frame.

20. The method of claim 17, further comprising:
analyzing at an encoder module an analog video signal coming from the video source for being a valid signal containing video information; and
skipping the recording in the storage module of at least one video frame of the encoded video stream if the at least one video frame is encoded from the video signal that is not a valid video signal and lacks video information.

21. The method of claim 17, further comprising:
analyzing at least one video frame of an encoded video stream for video noise; and
skipping the recording in the storage module of at least one video frame of the encoded video stream if the at least one video frame of an encoded video stream includes the video noise.

22. The method of claim 17, wherein the one or more encoded video files can be selectively erased from the storage module after successful recording of the one or more encoded video files on the at least one recording media.

23. The method of claim 17, wherein an encoded video file is burned on recording media as soon as there is an encoded video file to burn and there is recording media in the media burner module.

24. The method of claim 17, wherein a data tracker module activates the file reader module to resume providing data to the burner software module as soon as a new encoded video file is created in the storage module.

25. The method of claim 17, further comprising:
trans-coding the encoded video stream substantially in real-time.

26. A method to record one or more video files on a recording media, comprising:
receiving video signal from a video source;
encoding the video signal with an encoder coupled to the video source;
receiving an encoded video stream at a video capture module;
analyzing at least one key video frame of the encoded video stream to detect meaningful video images;
skipping any storing in a storage module of a sequence of video frames of the encoded video stream if at least one meaningful video image is not detected in the at least one key video frame of the encoded video stream;
storing the one or more encoded video files in the storage module having one or more encoded video files;
storing the file name and file information of the one or more encoded video files in a file info module;
providing the file name and file information of the one or more encoded video files to a file reader module to provide the one or more encoded video files to a burner software module that operates a media burner module having a recording media, wherein when a new recording media is inserted in the media burner module, the burner software module notifies a data tracker module, that in turn checks if there is an encoded video file available and if it is available, the data tracker module activates the file reader module to start sending data to the burner software module;
testing whether the recording media was adequate to record the one or more encoded video files; and
updating a file info module as the one or more encoded video files are successfully recorded on the recording media by the media burner module.

27. A non-transitory machine-readable storage medium having machine-executable instructions to record one or more video files on a recording media, comprising:
a module having machine-executable instructions to receive an encoded video stream;
a module having machine-executable instructions that can store the encoded video stream in a storage module organized as a set of video files;
a module having machine-executable instructions to analyze at least one key video frame of the encoded video stream to detect meaningful video images, and to skip any storing in the storage module of a sequence of video frames of the encoded video stream if at least one meaningful video image is not detected in the at least one key video frame of the encoded video stream;

a module having machine-executable instructions to store a file name and file information of the one or more encoded video files in a file info module;

a module having machine-executable instructions to provide the file and file information to a file reader module to provide the one or more encoded video files to a burner software module that operates a media burner module;

a module having machine-executable instructions to control the file reader software module with a data tracker module, wherein the data tracker module controls one or more operations of the file reader software module; and a module having machine-executable instructions to update the file info module as the one or more encoded video files are successfully recorded on a recording media by the media burner module.

\* \* \* \* \*